No. 669,981. Patented Mar. 19, 1901.
G. B. DAVISON.
POTATO PLANTER.
(Application filed Sept. 27, 1899.)
(No Model.) 6 Sheets—Sheet 3.

Witnesses
Geo. E. Trech.
Chas. R. Wright Jr.

Inventor
G. B. Davison
per Hubert Peak
Attorney

No. 669,981. Patented Mar. 19, 1901.
G. B. DAVISON.
POTATO PLANTER.
(Application filed Sept. 27, 1899.)
(No Model.) 6 Sheets—Sheet 4.
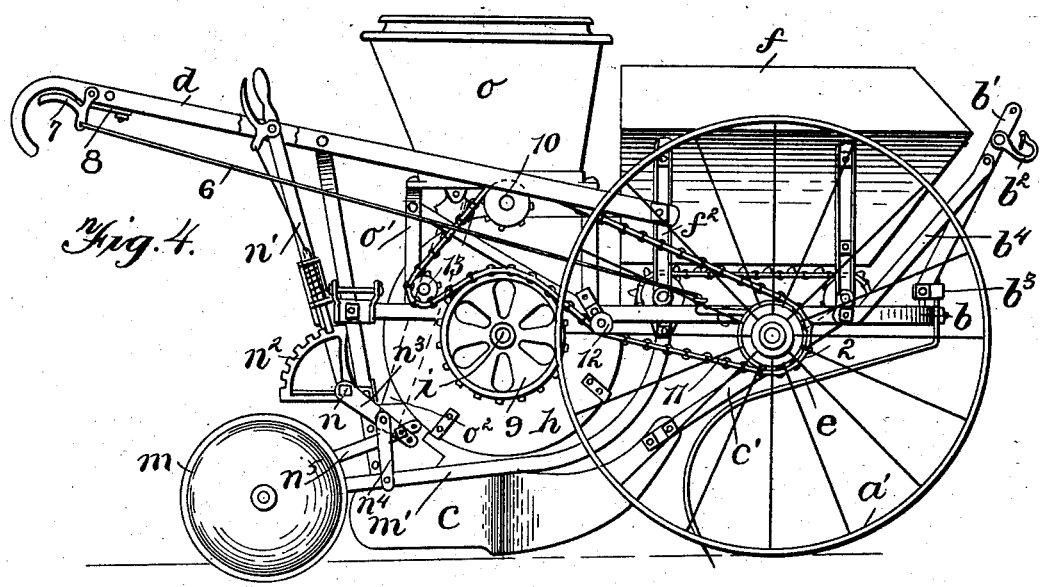
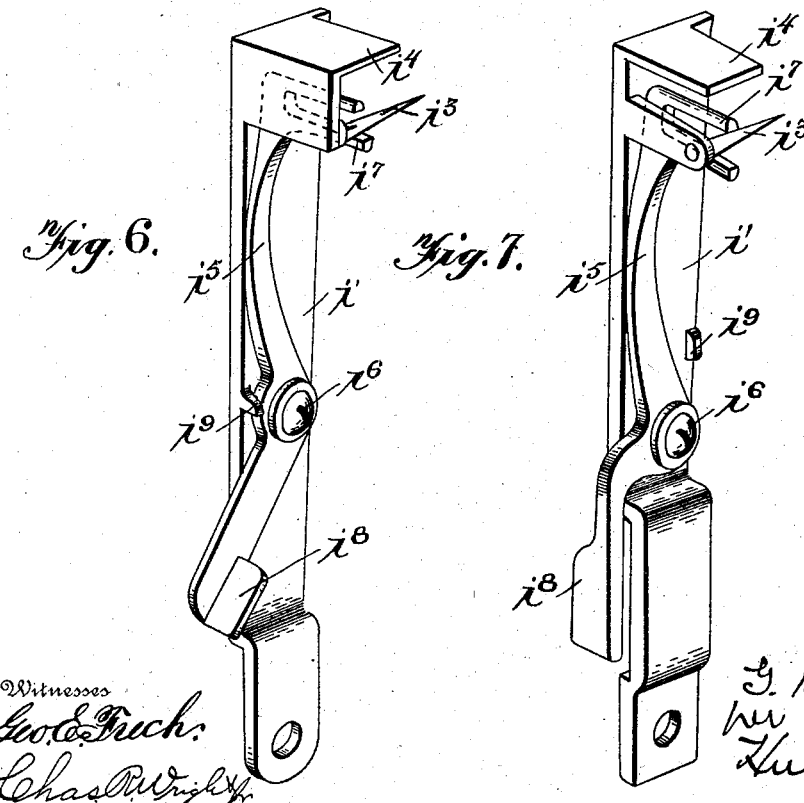
Witnesses
Geo. E. Frech.
Chas. R. Wright.
Inventor
G. B. Davison
per
Hubert Peak
Attorney
THE NORRIS PETERS CO., PHOTO-LITHO., WASHINGTON, D. C.

No. 669,981. Patented Mar. 19, 1901.
G. B. DAVISON.
POTATO PLANTER.
(Application filed Sept. 27, 1899.)
(No Model.) 6 Sheets—Sheet 5.

Witnesses
Geo. E. Frech.
Chas. R. Wright

Inventor
Geo. B. Davison
per Hubert E. Peck
Attorney

No. 669,981. Patented Mar. 19, 1901.
G. B. DAVISON.
POTATO PLANTER.
(Application filed Sept. 27, 1899.)
(No Model.) 6 Sheets—Sheet 6.
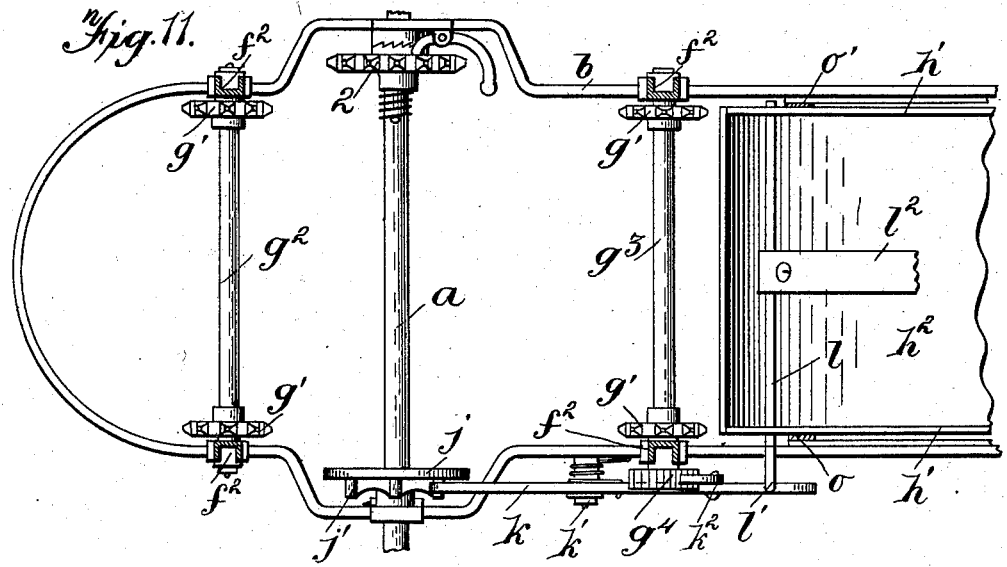
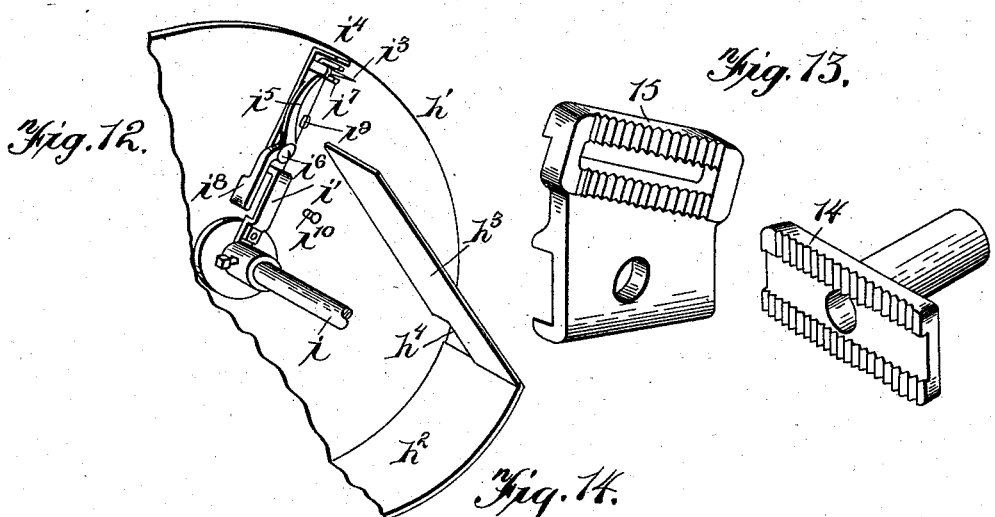
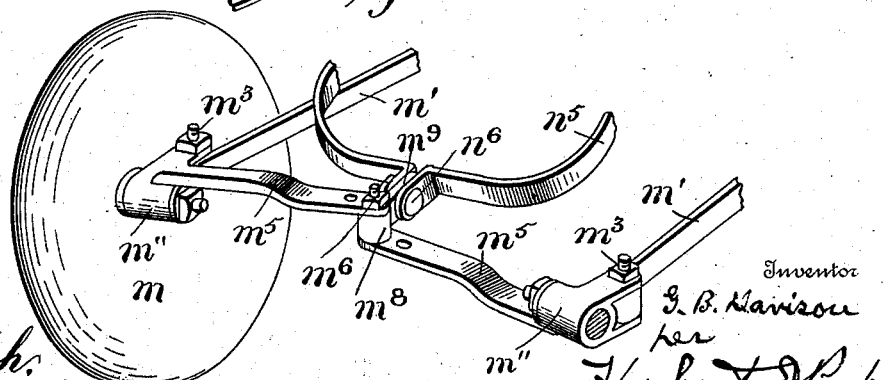

UNITED STATES PATENT OFFICE.

GEORGE BENNETT DAVISON, OF UTICA, NEW YORK.

POTATO-PLANTER.

SPECIFICATION forming part of Letters Patent No. 669,981, dated March 19, 1901.

Application filed September 27, 1899. Serial No. 731,822. (No model.)

*To all whom it may concern:*

Be it known that I, GEORGE BENNETT DAVISON, a citizen of the United States, residing at Utica, in the county of Oneida and State of New York, have invented certain new and useful Improvements in Potato-Planters; and I do hereby declare the following to be a full, clear, and exact description of the invention, such as will enable others skilled in the art to which it appertains to make and use the same.

This invention relates to certain improvements in potato-planters; and the objects and nature of the invention will be apparent to those skilled in the art from the following description of the accompanying drawings, which illustrate examples selected from various other constructions within the spirit and scope of my invention.

The invention consists in certain novel features in construction and in combinations and in arrangements of parts, as more fully and particularly pointed out and specified hereinafter.

Figure 1:
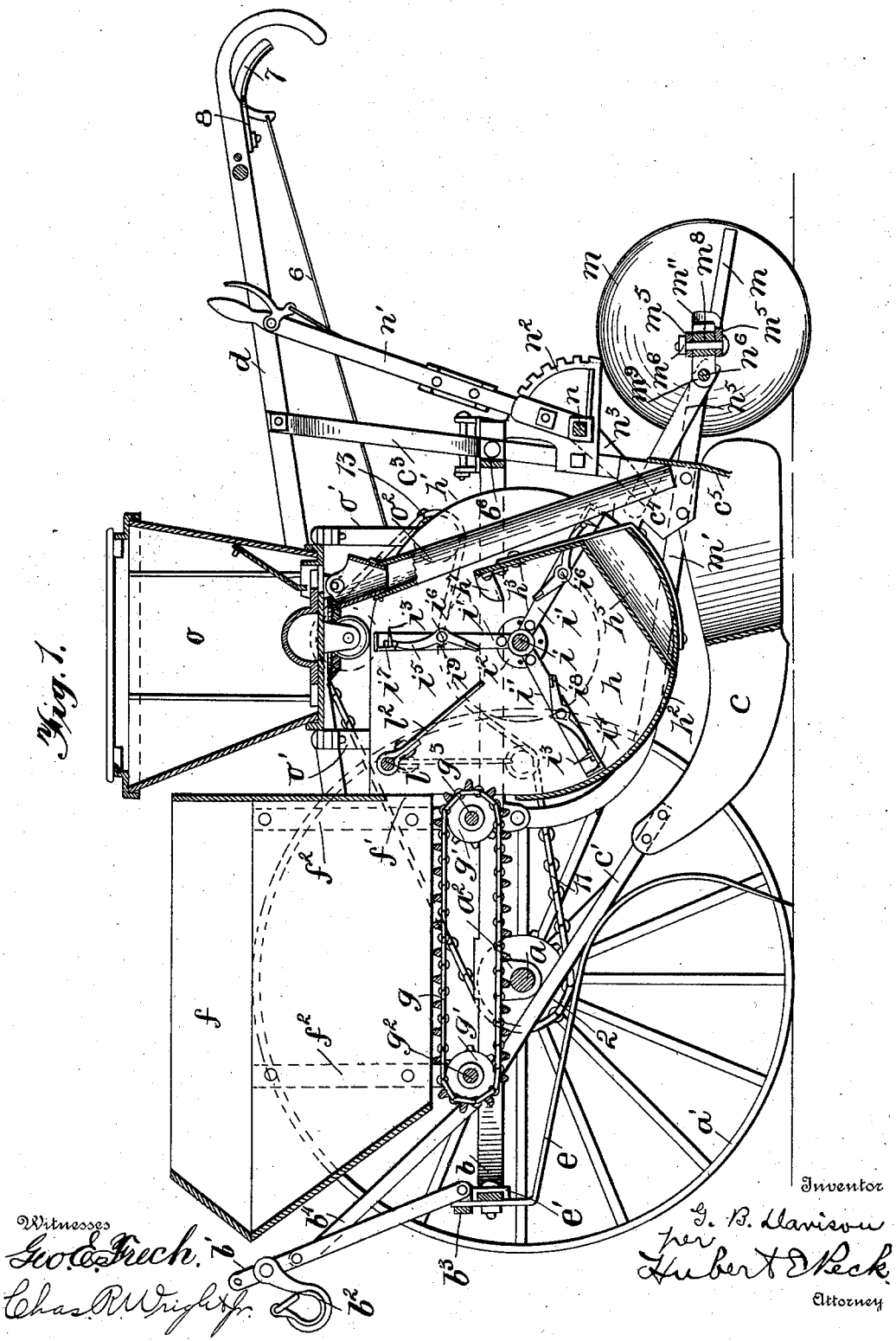
Figure 2:
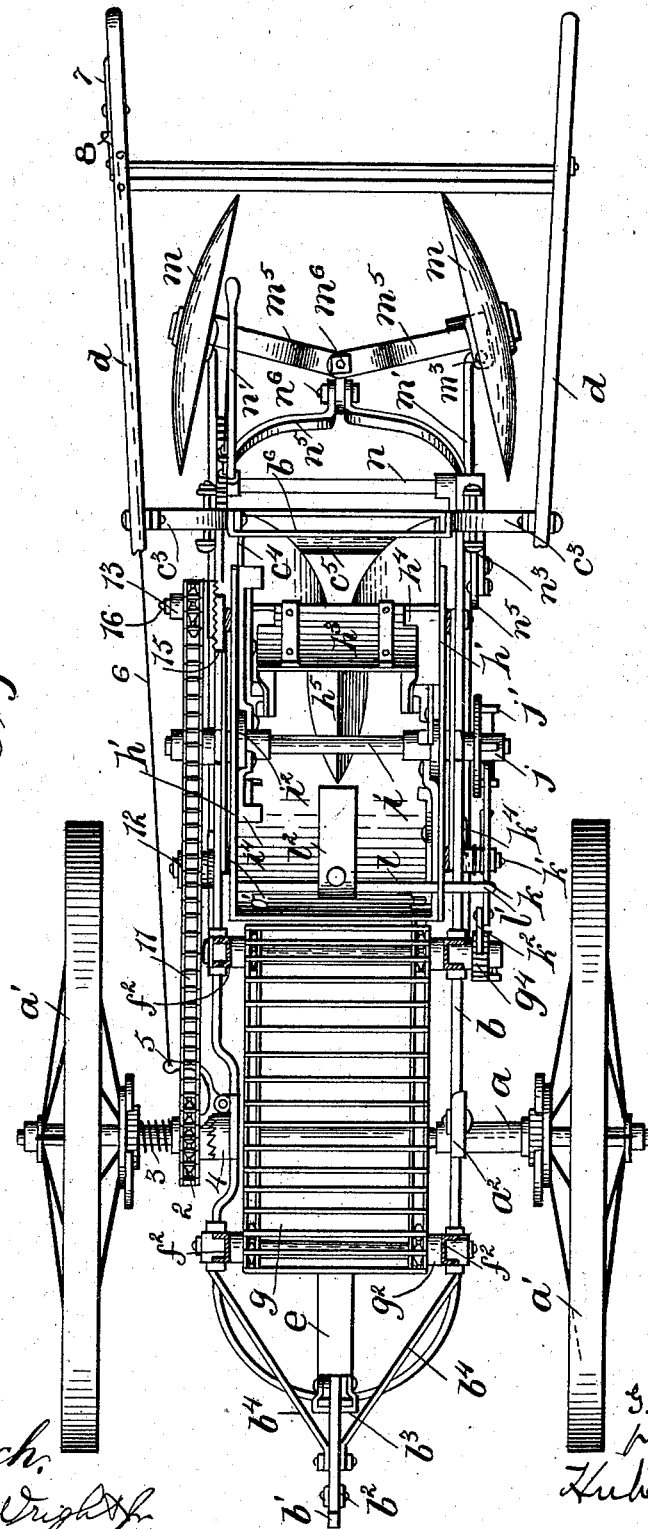
Figure 3:
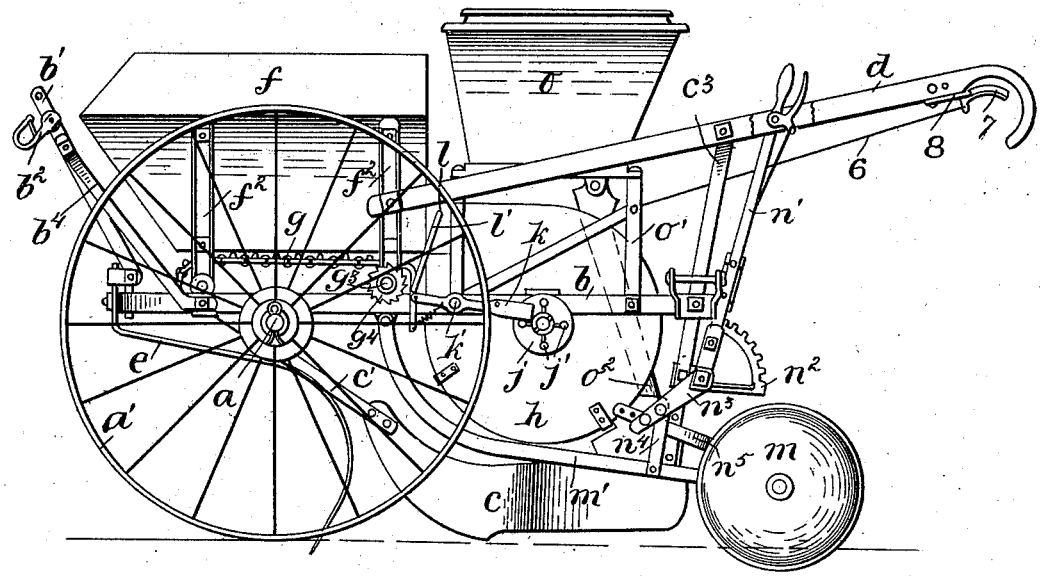
Figure 5:
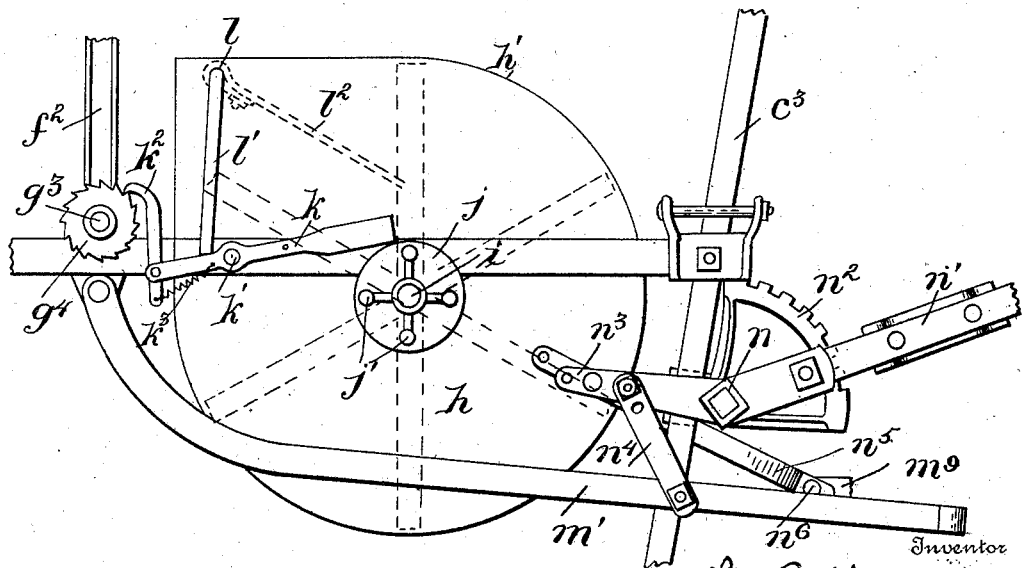
Figure 8:
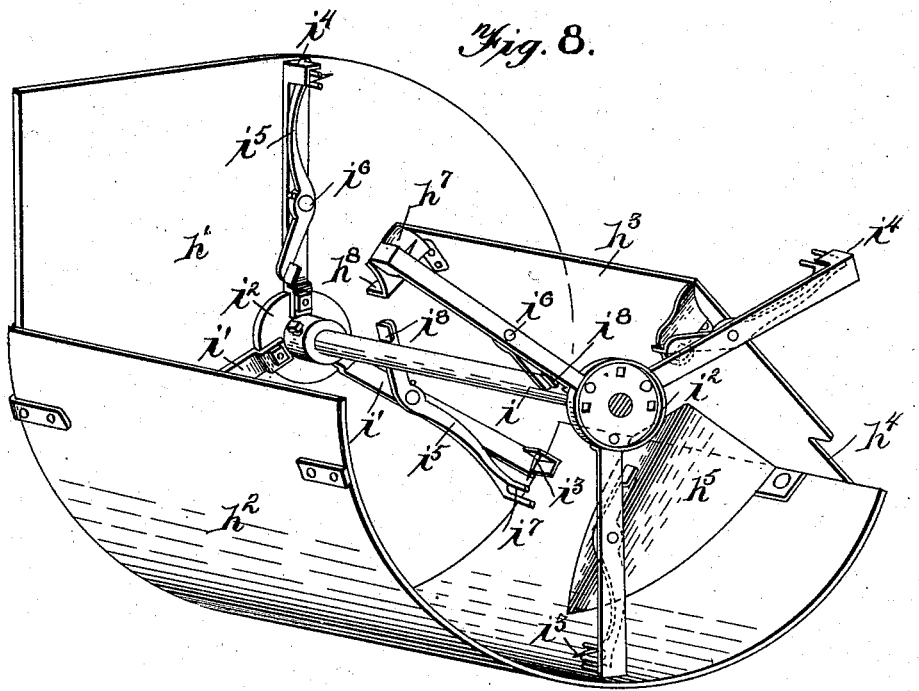
Figure 9:
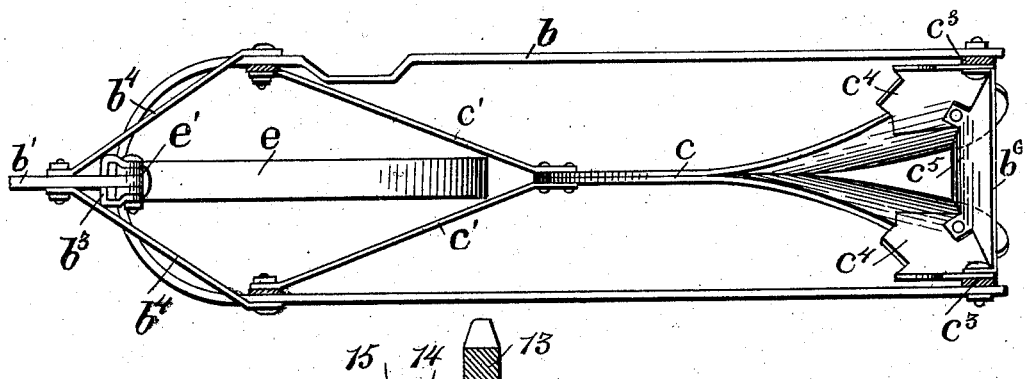
Figure 10:
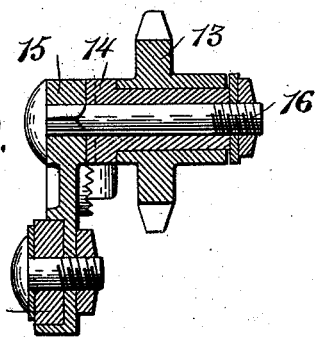

Referring to the accompanying drawings, Figure 1 is a central longitudinal section, the covering-disks being shown forced down and approximately parallel for transportation. Fig. 2 is a top plan, certain parts being broken away, the feed and fertilizer boxes being removed and the covering-disks shown set for covering. Fig. 3 is a side elevation. Fig. 4 is a side elevation of the side opposite that shown in Fig. 3. Fig. 5 is a detail enlarged side elevation of the picker-box and certain adjacent parts. Fig. 6 is a detail perspective of the picker-arm shown in Fig. 8. Fig. 7 is a detail perspective of the picker-arm shown in Fig. 12. Fig. 8 is a detail perspective, enlarged, of the picker-box and its contained mechanism, one end of the box being removed. Fig. 9 is a detail top plan of the main frame of the machine and certain devices attached thereto, other parts being removed and broken off. Fig. 10 is a detail sectional view through the chain-tightener, parts of which are shown in Fig. 13. Fig. 11 is a detail elevation of the front part of the main frame and front portion of the picker-box, the parts located above the main frame and axle being removed and other parts broken away, the ground-wheels not being shown and the axle ends broken away, the frame sides being shown deflected laterally at the axle instead of constructed as shown in other views, the cam-wheel for actuating the conveyer-driving rocking lever being shown on the main axle instead of on the picker-arm shaft, as shown in other views. Fig. 12 is a detail perspective showing part of the picker-box and shaft, illustrating the picker-arm of Fig. 7, and a projection from the picker-box end for tripping the dropping-lever, which can be employed instead of the cam or projection on the rear plate or dam of the box, as shown in preceding views. Fig. 13 is a detail perspective of parts of the chain-tightener shown in Fig. 10, the parts being shown separated. Fig. 14 is a detail perspective showing certain parts of the supporting and adjusting mechanisms for the covering-disks, one of said disks not being shown and its spindle shown broken away.

In the drawings, $a$ is a transverse axle, preferably, although not necessarily, located at the forward portion of the machine and provided with supporting-wheels $a'$, usually mounted loosely thereon and connected therewith by any suitable pawl-and-ratchet mechanisms to rotate the axle as the machine is moved forwardly and to turn freely on the axle when the machine is moved rearwardly.

$b$ is the main supporting-frame. This frame is approximately horizontal and is arranged longitudinally of the machine, or it can be constructed and arranged in any other suitable manner. In the drawings, as an example, I illustrate a U-shaped frame bent or otherwise formed of bar metal, having its closed or bent end projecting or located at the front of the machine and its two parallel side bars extending to the rear of the machine along opposite sides thereof. If desired, this U-shaped frame can be bent from a single bar of metal or otherwise formed integral, with its two rear ends braced and secured together by cross-bar $b^6$, if desired. This frame has castings or clips bolted to the opposite side bars thereof and provided with the journal-boxes $a^2$ $a^2$, Fig. 2, for the axle, said boxes being preferably arranged below the frame, so that the frame in effect rests directly on the axle and extends transversely across the same. The said bearing or journal boxes are usually arranged a distance in rear of the closed front end of the frame, so that the axle is located, say, about centrally beneath the feed-hopper, hereinafter described. The front end of the main frame is provided with suitable draft appliances. For instance, I show an upright standard $b'$, extending upwardly and forwardly from the front end of the main frame and at its upper portion provided with several holes, by means of which a clevis $b^2$ for attachment of the draft can be pivoted by a bolt or other means and adjusted vertically. The lower end of this standard $b'$ is properly secured rigidly to the frame by any suitable means, although for this purpose I show a clip $b^3$, to which the standard is bolted and which itself fits the center of the closed end of the frame and is rigidly bolted or otherwise secured thereto.

$b^4$ represents braces bolted or otherwise secured to the upper portion of the standard and from thence spreading laterally and extending downwardly and rearwardly to opposite sides of the frame to which they are respectively secured by proper means.

$c$ is the plow or furrow-opener, arranged beneath the plane of the rear portion of the main frame and centrally and longitudinally of the machine. The opener is formed of any suitable or approved construction and has the upwardly-extending nose, to which the two braces $c'$ are rigidly bolted or otherwise secured at their rear ends. These braces are spread laterally and extend forwardly and upwardly and at their front ends are rigidly secured, respectively, to opposite sides of the main frame. The opener is preferably arranged in rear of the axle, and said braces preferably extend forwardly beneath the axle and can be secured to the frame sides by the same bolts securing the draft-appliance braces $b^4$. The opener has the central front blade or nose formed with the downwardly and rearwardly inclined front cutting edge, which moves forward through the soil. The opener is bifurcated in rear of the blade to form the two oppositely-flaring wings or moldboards, as usual, which throw the earth laterally to form the furrow and between which the vertical passage of the opener exists through which the seed-potatoes are dropped into the furrow. The rear of the opener can be provided with a guide and deflector, as hereinafter set forth, which is shown in the form of a cross connection between the separated rear ends of the wings of the opener.

$c^3$ $c^3$ are rigid upright braces, at their lower ends secured to the rear ends of the opener-wings or moldboards, respectively. Said upright braces extend upwardly from the rear ends of the opener-wings and are rigidly secured to the rear ends of the main-frame sides, usually by the same bolts securing the cross-bar $b^6$ to said frame sides. These uprights $c^3$ $c^3$ are extended upwardly a suitable distance above the main frame, and the handles $d\ d$ are secured to the upper ends thereof, as hereinafter set forth.

In the practical operation of potato-planters difficulty has been encountered because of the accumulation of trash at the front cutting edge of the opener. The front cutting edge of the opener is usually inclined downwardly and rearwardly, and the trash and vines are apt to collect and hang on and pack under said edge and cause the opener to ride up thereon or otherwise prevent the proper furrow-opening or digging operation thereof. To avoid this difficulty, I provide a suitable clearing device in advance of the opener, which will so vibrate as the machine advances as to afford and cause the proper clearance of the opener. In practical operation I have found a spring harrow-tooth of peculiar advantage and utility in this relation, although other features of my invention are not limited to the employment of a clearing device. In the example shown for this purpose, $e$ is a flat metal spring-tooth having its end bent vertically and secured to the central portion of the front end of the main frame, usually by the bolt securing the draft-standard thereto. The upper end of the tooth can be additionally or solely secured by a clip $e'$, partially embracing the same, with its ends secured to and on opposite sides of the clip or casting $b^3$, as by the bolt securing draft-standard $b'$ to said clip $b^3$. The tooth from said vertical end has the long rearwardly and downwardly extending portion centrally and longitudinally beneath the frame and between the opener-braces $c'$. The rear end of the tooth is then deflected downwardly a short distance in advance of the front cutting edge of the furrow-opener, so that the point of the tooth engages the soil in front of the opener and protects the same. By reason of the peculiar constant vibration of such a tooth the trash will be separated and scattered and prevented from hanging on the front edge of the opener and the opener will be able to clear itself and perform its proper functions.

$f$ is the feed-hopper, usually mounted on the front portion of the machine, over the axle. This hopper or receptacle is of sufficient size and capacity to receive a comparatively large quantity of the potatoes prepared for planting, so that the machine will plant as large a section as possible without refilling. The hopper is open at the top and bottom and has a discharge-opening $f'$ at its lower rear end. The bottom of the hopper is formed and the potatoes in the hoppers are supported by a suitable intermittent-feeding device. As an example of what might be employed for this purpose I show the endless conveyer $g$, forming the floor or bottom of the hopper and supporting the contents thereof.

The hopper is supported and secured on the machine in any suitable manner. For instance, I show standards $f^2$, rigidly secured to the side bars of the U-shaped frame and extending up therefrom at the outer sides of the hopper, said hopper being rigidly secured to said upright standards. If desired, the front standards $f^2$ can be secured by the same bolts securing the draft-standard and opener-braces to the frame, although my invention is not so limited. The rear standards $f^2$ are shown to receive and have bolted thereto the front ends of the handles $d\ d$, which are otherwise secured, as hereinbefore described, and extend a suitable distance in rear of the machine and are properly connected and braced. The conveyer is preferably, although not necessarily, composed of parallel drive-chains connected by separated cross-slats rigid with the chains. The chains travel on sprocket-wheels $g'$, rigid on the two shafts $g^2\ g^3$, arranged transversely beneath the hopper and at the front and rear ends of the open lower end thereof. These shafts are arranged just above the U-shaped main frame. The front shaft $g^2$ has an idler and is mounted in suitable bearings or boxes in the two front hopper-standards $f^2$, so that the conveyer is located between said standards. The rear drive-shaft $g^3$ is correspondingly journaled in the rear hopper-standards $f^2$ and is intermittingly or periodically rotated by suitable actuating mechanism in a direction to longitudinally move the top ply of the conveyer rearwardly, and thus discharge potatoes rearwardly through hopper discharge-opening $f'$ into the picker-box, as hereinafter specified.

Suitable controlling means are provided, as hereinafter specified, whereby the conveyer is only operated to feed potatoes into the picker-box when the quantity of potatoes in said box is reduced below a certain or predetermined quantity, point, or level, so that an approximately even quantity of potatoes is maintained in the picker-box and potatoes are automatically and periodically discharged thereinto to maintain said quantity.

$h$ is the picker-box, preferably arranged at the rear portion of the machine adjacent to and immediately in rear of the feed box or hopper, so that the discharge passage or port of the feed-box opens directly into the picker-box. The picker-box is rigid with and located between the side bars of the main frame and in a plane generally below the plane of the feed-box, so that the potatoes drop from the feed-box into the picker-box—that is, the conveyer discharges into the picker-box. In the example shown in the drawings the picker-box is composed of the two vertical side or end disks $h'\ h'$, usually about circular or rounding in shape and secured rigidly to the side bars of the main frame with their upper rear portions extending to or about to the rear end of the feed-box and extending up at opposite sides of the discharge port or opening thereof, so that the potatoes dropping from the rear end of the conveyer will be properly confined and guided and fall into the picker-box. The bottom $h^2$ of the picker-box is rigidly secured to said end disks or sides in any suitable manner and extends from a point at or immediately below the rear or discharge end of the conveyer downwardly and curves rearwardly and upwardly a short distance at the lower rear portion of the picker-box. Said picker-box bottom is preferably segmental, and the curvature thereof is preferably struck from approximately the same center on which the picker-arms move, as hereinafter set forth.

$h^3$ is a rigid vertical plate or dam closing the rear of the picker-box against the accidental escape of potatoes. This plate is arranged in an upright or inclined position between the end disks $h'\ h'$, usually a distance forwardly from their rearmost portions, and extends up from the rear edge of the curved bottom $h^2$ and is rigidly secured thereto by suitable means. The said plate does not extend to the top of the picker-box, and clearance-spaces are left between its vertical edges and the inner faces of the end disks $h'\ h'$ for the picker-arms, said clearance-spaces being enlarged at their lower ends $h^4$, at the top edge of bottom or floor $h^2$, for the passage of the picker-arm heads. The floor or bottom of the picker-box is provided with the wedge or inverted-V shaped deflector, distributer, or guide $h^5$, arranged centrally between openings $h^4$ and extending from plate $h^3$ forwardly along the floor of the picker-box and gradually tapering downwardly or converging in width and height to about the lowest portion of said floor.

$i$ is the rotary picker-shaft, passing transversely and centrally through the picker-box, with its ends projected beyond the sides thereof and beyond the main-frame sides or bars and preferably mounted in suitable journal-boxes secured to said main-frame sides. The shaft carries the two series of radial picker-arms $i'$. The arms of one series travel through one end of the picker-box and against or adjacent to one box-end disk, while the picker-arms of the other series are correspondingly located at the opposite end of the box, and the arms of the two series are arranged in alternation—that is, the arms of one series are arranged opposite the spaces between arms of the other series. The picker-arms are rigid with the shaft and are preferably secured removably thereto, so that the distances between the hills planted can be increased or diminished by securing additional picker-arms at the proper locations in the series of arms or by removing the picker-arms, but in either case maintaining the arrangements so that the arms are equally spaced and opposite arms drop potatoes alternately.

In the example shown the picker-shaft has disks $i^2\ i^2$ rigid thereon and turning against the inner faces of the picker-box ends, respectively. The inner end of each picker-arm is formed to lap over the inner face of its disk and is secured thereto by any suitable means, such as a machine-screw or a bolt having its head countersunk in the face of the disk adjacent to the box end, so that the nut can be easily removed and the picker-arm taken off. If desirable, the disks can be locked to the shaft by set-screws, so that the disks can be moved longitudinally on the shaft to facilitate shifting or removal of the picker-arms or so that the disks can be turned on the shaft to properly locate the series of arms. If desirable, each disk can have a number of additional bolt-holes, as shown, to permit proper distribution of the arms according to the number employed. Thus if only two arms be employed on a disk said arms should be located diametrically opposite each other, while if three arms are employed on a disk, as shown, they should be located one hundred and twenty degrees apart, the opposite three arms alternating therewith. If desired, one or more arms on each disk can be socketed therein about as shown, so as to guide the proper spacing of the remaining arms. Each arm preferably has the flat face traveling close to the box end to deflect the potatoes outwardly therefrom. The free end of each arm is provided with suitable potato grasping or picking-up means. For instance, I show the end of each arm enlarged laterally or formed with an inwardly-projecting head provided with a forwardly-projecting rigid pin or sharp projection $i^3$. The pin preferably extends from the head of the arm approximately at right angles and in the direction of rotation thereof and a suitable distance inwardly of the arm from the outer end thereof and laterally from the face of the adjacent box end. The outer end of the arm is provided with a forwardly-projecting flange or support $i^4$, which sweeps along the floor of the picker-box and deflects the potatoes upwardly therefrom and assists the picker-pin in carrying and supporting the impaled potatoes and holds the potato against turning or twisting on the pin and from becoming disengaged therefrom. The side flange or enlargement of the arm which sweeps the box end also assists in the same way. Each picker-arm is also provided with suitable potato-discharging means or an ejector for releasing and dropping the potato at the proper location, as hereinafter specified. For instance, I show a lever $i^5$ on and approximately parallel with the picker-arm and at an intermediate point $i^6$ fulcrumed thereto, so that the lever swings in a plane parallel with the plane in which the arm moves. At its outer free end the lever has a lateral fork or bifurcated end $i^7$ opposite the arm-head and adapted to loosely straddle the picker-pin and rest against the arm-head at the base of the pin. The opposite inner end of the lever has a lateral tripping projection $i^8$. The lever is preferably so formed that its bifurcated or forked end is heavier than the other end, and a stop $i^9$ is preferably provided to limit the swing of the forked end away from the picker-pin. The picker-box is provided with suitable mechanism properly located to actuate the dropper to eject the potato at the desired point. For this purpose I can provide the rear plate or dam $h^3$ of the picker-box with inwardly-projecting plates or projections $h^7$ at its opposite upper corners, said plates extending into the picker-box beside the paths of the picker-arms, respectively. Each plate $h^7$ has a lateral rigid cam or trip $h^8$ projecting toward the adjacent picker-box end and into the path of each projection $i^8$ of the dropper or ejector levers, so that as the picker-arm moves rearwardly and downwardly the inner end of the dropper engages said dam and is retarded, thereby swinging the lever so that its forked end moves forwardly beyond the picker-pin and forces off the potato thereon, as hereinafter set forth.

The picker-shaft is so rotated that the picker-arms sweep forwardly along the bottom or floor of the box and rearwardly at the top of the box and drop their potatoes when they assume about the horizontal position in their downward movement at the rear of the box. The rear wall or dam $h^3$ of the box is located a distance within the end disks of the box, so that said picker-arms extend a distance beyond and in rear thereof in their movement, and hence drop the potatoes in rear of said dam and between the projecting rear portions of the box end disks. As each picker-arm head enters the picker-box at the bottom of said rear wall or dam its pin is projecting forwardly and the forked end of the ejector is swung out in advance of the pin. The potatoes in the box are distributed and deflected laterally toward the box ends and into the paths of the picker-arms by the central deflector $h^5$, which overcomes the natural tendency of the potatoes to pile up between the two paths in which the arms move. Of course as the picker-arms move through the potatoes in the box they are knocked and forced toward the center of the box; but by employing said deflector one picker-arm is caused to knock and force the potatoes over into the path of the other arm, so that the potatoes are thus forced and guided alternately from one end of the box to the other and are in a measure concentrated at the inner corners of the rear wall or dam $h^3$, where the deflector is widest and where the picker-arms enter and each picks up its potato. Thus the picker-arms are enabled to remove practically all the potatoes from the picker-box when the feed from the feed hopper or box ceases. As each picker-arm enters the picker-box at the bottom of the rear dam the dropper-lever engages a potato and is forced back on the pin, and the pin impales the potato and holds the same, carrying it around through the box until it is ejected or dropped, as hereinbefore described, at the rear of the said dam.

It is not desirable to keep the picker-box full of potatoes nor to maintain a large quantity of potatoes therein; but it is preferable to maintain an approximately even quantity of potatoes therein. For these and other reasons I provide mechanism whereby the potatoes are periodically or intermittingly supplied to the picker-box as the supply therein is reduced below an approximately fixed or predetermined level and quantity. Various mechanisms can be provided for this purpose. I employ automatic mechanism, which can include an endless conveyer in a feed-box, as hereinbefore described, actuating mechanism and controlling means controlled virtually by the quantity of potatoes in the picker-box, whereby the actuating mechanism is automatically thrown into and out of driving relation with (or into and out of gear with) said conveyer. As an example of one construction for this purpose within the spirit and scope of my invention I show an extended end of conveyer drive-shaft $g^3$ provided with a ratchet-wheel $g^4$, rigid thereon and usually located at a point beyond the side of the main frame. The corresponding end of the picker-shaft $i$ is provided with a series of cams or separated projections. For instance, I show the disks $j$ rigid on the projected end of said picker-shaft and formed at one side face with a series of equally-spaced lateral projections $j'$.

$k$ is a vertically-rocking lever, at an intermediate point $k'$ fulcrumed to the adjacent side bar of the main frame and at one end provided with a spring-actuated hook-pawl $k^2$, pivotally joined to the lever and arranged in an approximately upright position, with its tooth in engagement with ratchet-wheel $g^4$, to which said toothed end is yieldingly held by spring $k^3$, so that when the front end of the lever moves up said pawl will slip over the teeth of the ratchet-wheel, and when the lever is oppositely swung said pawl will rotate said ratchet-wheel, and thereby move the conveyer to discharge potatoes into the picker-box. The opposite end of the lever extends beside the disk $j$ and is yieldingly held against the projections or separated cam-surfaces $j'$ thereof by the spring $k^4$, so that as the picker-shaft rotates said lever will be rocked by the successive engagement of said cams therewith, the lever end dropping from cam to cam. Controlling mechanism is provided to prevent operating action of said lever on the conveyer-shaft ratchet-wheel when the picker-box contains the desired quantity of potatoes. For instance, as an example I show a rock-shaft $l$ arranged transversely of the upper portion of the picker-box and usually mounted in the end disks or frames thereof. I usually arrange this shaft in the upper part of the picker-box adjacent to the feed-opening thereinto from the feed-box. $l'$ is a radial arm depending from said rock-shaft over the lever $k$ and arranged to form a stop limiting the swing of said lever or a lock to prevent the swing of said lever. The arm or stop $l'$ is so arranged that when said shaft swings in one direction the lever will be released to permit actuating swing of the said lever, and when swung in the opposite direction it will move to a point over and within the path of the lever and prevent said actuating swing thereof, and hence stop the movement of the conveyer. The rock-shaft is provided with a rigid wing $l^2$, fixed on the shaft and depending radially therefrom into the picker-box and so arranged and of such form that when the picker-box contains the desired quantity of potatoes said wing will be engaged by the potatoes in the box and swing upwardly and rearwardly, and thereby rock the shaft to cause its arm $l'$ to stop the movement of the conveyer, and consequently stop feeding of the potatoes into the picker-box. As the potatoes are discharged from the picker-box and the quantity of potatoes therein decreases, said wing drops gradually and swings the stop-arm away from the lever and permits such swing of the lever as will actuate the conveyer and replenish the potatoes in the picker-box. The said wing preferably rests on the potatoes in the box and drops by gravity, the rock-shaft and stop-arm being so arranged that the weight of the wing is sufficient to operate the same as the supply of potatoes in the picker-box is reduced. The wing is preferably located opposite and adjacent to the feed-opening into the picker-box, and said wing usually extends down in the picker-box to a point below the horizontal plane of the said feed-opening into the picker-box. The furrow-opener hereinbefore described is arranged below the picker-box, and its open rear end is below the rear end of the picker-box and immediately in rear of the vertical plane including said rear dam of the picker-box, so that the picker-arms drop their potatoes over said open end of the furrow-opener, between the converging sides or moldboards thereof. The said sides or moldboards of the opener are provided, respectively, with upwardly and outwardly curving or extending guides or deflectors $c^4$ $c^4$ beneath the dropping positions of the picker-arms, so that the potatoes are dropped into said guides $c^4$ and deflected inwardly to the passage of the opener. The upright standards $c^3$ $c^3$ are usually secured to the rear end of the moldboards about at said guides and extend upwardly at the outer faces thereof.

$c^5$ is a rear deflector or guide in the form of a cross-plate between and secured to the rear ends of the moldboards and closing the rear of the opener-passage. This cross-plate is preferably curved downwardly and forwardly to properly deflect the potatoes engaging the same as they drop from the picker-arms. These guides deflect the potatoes dropped alternately from opposite sides of the picker-box all to the same passage through the opener, so that the potatoes are planted in hills in parallel rows.

The standards $c^3$ and the cross-deflector $c^5$ are strongly braced and strengthen the opener and render the same an exceedingly strong, durable, and rigid structure for the purpose intended. The cross-deflector $c^5$ preferably ends a distance above the lower edges of the opener, so as not to collect earth in the passage between the moldboards.

Suitable mechanism is provided in rear of the opener to cover the furrow and potatoes, and I prefer to employ such mechanism as will enable the operator to control the depth at which the potatoes are planted without requiring the constant attention of the operator and without requiring an operator to sit over and control or operate the coverers with his feet. As an example of a construction within the spirit and scope of my invention, I show a pair of vertically-movable laterally or horizontally tiltable disks $m$ $m$. These disks are carried by a vertically-swinging frame which comprises the parallel bars $m'$ $m'$, extending forwardly and upwardly on opposite sides of the machine and at their upper front ends pivotally joined, respectively, to the side bars of the main frame, so that both bars swing vertically approximately on the same axis or from the same center. If desired, said bars can be pivotally joined to the depending ends of the rear standards $f^2$ of the feed-box about as shown. Each vertically-disposed rotary disk $m$ has its horizontal spindle, axle, or pintle mounted to turn in a bearing or journal-box $m''$, which is pivotally joined to the end of a vertically-swinging bar $m'$ to swing or turn horizontally. The ends of the bars $m'$ are shown with vertical eyes or openings, and the journal-boxes $m''$ have lateral ears fitting said eyes and loosely coupled thereto by vertical bolts $m^3$. The journal-boxes are usually located in rear of the bar extremities $m'$, with the disks at the outer sides of said bars having their concave sides facing inwardly and opposite each other, so that the said concave faces throw the soil inwardly and in opposite directions to cover the furrow. The front portions of the disks are preferably arranged beside the rear ends of the respective moldboards of the opener and a distance therefrom, so that the opener throws the soil outwardly against the disks, which then both deflect the soil inwardly and back again to its original position, closing the furrow and covering the potatoes deposited therein through the furrower.

Suitable mechanism is provided to raise and lower the coverer and simultaneously shift the angle of the disks to throw a greater or less amount of soil into the furrow, and thus determine the depth at which the potatoes are planted. I prefer to so change the angle of the disks as they are raised that their rear portions will approach each other, and consequently increase the angle of the disks to the line of draft, and as the disks are lowered or forced to dig deeper in the soil to decrease their angle to the line of draft and cause their rear portions to recede from each other. As an example of what might be employed for this purpose I show a horizontal rock-shaft $n$ mounted transversely above the vertically-swinging bars carrying the covering-disks, preferably in journal-boxes secured to the rear standards $c^3$ $c^3$. A hand-lever $n'$ is rigid with said rock or lifting and depressing shaft and extends in an upward direction therefrom. Suitable means are employed to lock said shaft in the desired position, such as rigid toothed sector $n^2$, and the spring-actuated pawl or dog carried by the lever and engaging teeth of said sector and provided with an operating hand-clip, as usual. The dog can be released by the clip when it is desired to swing the lever and shaft. When released, the dog springs into the sector to lock the parts together, as usual. The rock-shaft has the rigid end crank-arms $n^3$ $n^3$ over the disk-carrying bars and connected thereto, respectively, by the links $n^4$ $n^4$, pivotally joined to said bars and to said crank-arms. Said links can have longitudinal series of bolt-holes, and removable pivot-bolts can be provided to lock the parts, whereby the parts can be adjusted to suit various conditions. $n^5$ $n^5$ are also links pivotally joined, respectively, to the free ends of said crank-arms and extended downwardly and rearwardly and converging in rear of the furrow-opener and pivotally joined by a horizontal pivot $n^6$ to the pivotal joint between a toggle connecting the two journal-boxes of the covering-disks. Each disk journal-box has a rigid inwardly-extending arm $m^5$ rigid therewith. At an intermediate point between the disks these two arms are pivotally joined by a vertical pivot $m^6$. A spacing-sleeve $m^8$ is mounted on said pivot $m^6$ and is provided with a projection $m^9$, to which links $n^5$ are pivotally joined by pivot $n^6$, as before described.

The arms $m^5$ and links $n^5$ can have several pivot-holes to permit adjustment of the parts, as is obvious to those skilled in the art.

It is obvious that when the rock-shaft lever is forced rearwardly and downwardly the shaft is rocked to swing up the crank-arms and raise the vertically-swinging bars or frame carrying the rotary covering-disks and that the links $n^5$ are simultaneously drawn upwardly and forwardly, thereby swinging both disk-arms $m^5$ forwardly and rocking the disk journal-boxes to cause the rear portions of the disks to approach each other as the disks are elevated, and hence increase the angle of each disk. When the rock-shaft is moved in the opposite direction, the disks are forced down and at the same time links $n^5$ are forced rearwardly to straighten out the toggle between the disks and decrease the angle of the disks and bring the plane of each disk more nearly parallel with the line of draft. The disks can thus cut deeper, but will not throw the earth laterally to the extent as when in the other position just described. The cutting depth of the furrow-opener can be controlled in a measure by the rotary covering-disks. Thus when the disks are elevated the opener will cut a deeper furrow, and consequently the angle of the disks is increased to throw a larger quantity of soil into the furrow and cover the potatoes to a greater depth. When the disks are forced down to a greater depth, the opener does not cut such deep furrows and the disks do not have such an angle or throw, and consequently the potatoes are not planted so deep as when the parts are adjusted as previously mentioned.

If desired, I can provide the machine with a fertilizer-distributer having a discharge-nozzle arranged to deposit the fertilizer in the hill with each potato or to one side of each potato or just in rear thereof after a slight depth of earth has been deposited on the potato.

$o$ is a fertilizer-box, which for the sake of convenience I show a distance above the picker-box, rigidly secured to standards or supports $o'$, rigidly secured to the side bars of the frame and extending up at the outer sides of the picker-box. This fertilizer-box is provided with any suitable dropping or distributing mechanism which discharges into the discharge spout, nozzle, or tube $o^2$. This spout comprises a top annular head or ring loosely pivoted to the under side of the fertilizer-box to swing back and forth and laterally and a flexible depending tube at its upper end secured to and carried by the said ring. By employing this loose support and the flexible tube the spout can be swung or bent to deliver the fertilizer at almost any point desired in the furrow. Thus the spout can be inserted in the passage of the furrow-opener, in advance of the cross-deflector thereof, and arranged to deposit the fertilizer in the furrow with the potatoes, or it can be bent laterally in either direction to deposit the fertilizer to one side of the potatoes, or it can be placed in rear of the opener to deposit in rear of or between the potatoes. Any suitable fastening means, as a cord, (not shown,) can be employed to hold the spout laterally in either direction at an angle.

The machine can be provided with suitable markers, if desired, although I have not deemed it necessary to show such devices in the drawings.

Any suitable gearing or driving mechanism can be employed to actuate the various movable parts of the machine. I have shown a convenient and practical mechanism for this purpose, wherein a driving sprocket-wheel 2 is mounted on the driving-axle $a$. This wheel is loose and movable longitudinally on the axle, and a stiff coiled spring 3 is employed to hold said gear in gear with a clutch causing the sprocket to rotate with the axle. The sprocket forms one member of the clutch, and the other member 4 is rigid with the axle $a$ and provided with teeth to intermesh with and drive the sprocket. The clutch is thrown out of gear by an angle-lever 5 at an intermediate point, fulcrumed to a bracket rigid with a frame side bar and having one arm engaging said sprocket and its opposite arm provided with a pull connection 6, extending along one of the machine-handles to hand clip or lever 7, pivoted to said handle at or near the handhold thereof. The parts are so arranged that when the hand-clip is pressed to the handhold said angle-lever will move the sprocket longitudinally on the axle against the tension of the coiled spring and out of mesh with the clutch, so that the axle rotates freely in the sprocket. A pivoted catch 8 can be provided on the handle to hold the parts out of gear, as just described, for transportation. When the hand-clip is released, the coiled spring will automatically throw the parts into gear.

The extended end of the picker-shaft $i$ is provided with a sprocket-wheel 9, and 10 is the exterior sprocket for driving and properly timing the fertilizer-dropping mechanism.

11 is the driving sprocket-chain, passing around drive-wheel 2, with its lower ply passing over and into mesh with the picker-shaft sprocket to rotate the picker-arms in the proper direction. The upper ply of the chain passes over the distributer-sprocket 10 and rotates the same in the proper sequence.

12 is a smooth-faced adjustable idler secured to the frame and holding the chain down to the picker-shaft sprocket.

A chain-tightener is provided comprising a sprocket-pinion 13, around which the chain passes. Said pinion is mounted on a spindle projecting from base 14, clamped adjustably to bracket 15, bolted or otherwise secured to the main frame-bar. The bracket has a toothed face receiving the correspondingly-toothed face of the base 14. The toothed portion of the bracket is longitudinally slotted, and a clamping-bolt 16 passes therethrough and through the base 14 and spindle and has a washer confining the sprocket-pinion thereon and a clamping-nut. By loosening the nut the sprocket-pinion can be shifted to tighten or loosen the chain, the base moving longitudinally of the bracket and the bolt moving in said slot. The chain-tightener is shown in Figs. 10 and 13.

Many advantages are attained by employing disk coverers in connection with mechanism, broadly, for shifting the angle thereof with respect to the line of draft. Said disks can constitute a rear wheeled support for the machine during transportation by depressing them to a point below the plane or level of the shoe or furrow-opener, at which adjustment the disks are substantially parallel with each other and rotate in planes parallel with the line of draft. When thus transported, the machine is supported at the front by the ground-wheels and at the rear by the covering-disks, which in such instance act as wheels.

If desired, the side bars of the frame can be formed with lateral outward deflections over the axle, as shown in Fig. 11, so that the gearing or gear-wheels on the axle can be arranged between the frame-bars instead of outside of said bars, as shown in previous views of the drawings. By this arrangement the wheel-hubs can be arranged close to the frame bearing-boxes for the axle, and under some conditions the arrangement possesses advantages over that shown in previous figures of the drawings. Fig. 11 also shows the cam-wheel $j$ on the axle instead of on the picker-shaft, the rocking lever $k$ also being shown reversed from the position shown in other views of the drawings to rotate the ratchet-wheel $g^4$ from the cam-wheel $j$, as previously described, and having its rear end extended under the arm $l'$, to be locked thereby, as previously described, when the picker-box contains the desired quantity of potatoes. Under certain conditions the jar caused by the lever $k$ dropping from projection to projection of the cam-wheel $j$ when located on the picker-shaft might jar potatoes from the picker-arms. The location of the cam-wheel on the axle avoids such jarring of the picker-shaft.

Instead of locating tripping projections on the rear dam $h^3$ of the picker-box, as shown in Fig. 8, the ends of the picker-box can be provided with projections $i^{10}$, as shown in Fig. 12, and the picker-fingers can be formed about as shown in Fig. 7. In this arrangement the projections $i^{10}$ can be formed by bolts projecting the desired distance beyond the inner faces of the box ends and located at the proper points, and the picker fingers or arms can be formed with lateral offsets or recesses at their faces against the box ends to permit the arms passing the said projections without engagement therewith. The inner ends of the dropping-levers will be arranged opposite said recesses to engage said projections, as shown in Figs. 7 and 12. Under some conditions advantages are attained by thus locating the projections on the ends of the picker-box rather than locating them on the rear dam, which might become bent or slightly displaced.

I have thus described the example shown of constructions within the spirit and scope of my invention with great exactness and detail merely for the sake of clearness; but it is obvious that my invention is not so limited and that various features thereof are not limited to employment in the particular machine or class of machines illustrated, and it is also evident that various changes might be made and modifications resorted to in the forms, constructions, and arrangements of the parts described without departing from the spirit and scope of my invention. Hence I do not wish to limit myself to the construction shown and described.

Having thus fully described my invention, what I claim as new, and desire to secure by Letters Patent of the United States, is—

1. A planter having a coverer comprising a vertically-movable carrier provided with rotary horizontally-tiltable disks, and mechanism for raising and lowering the disks and tilting or changing the angle thereof and locking the same in the desired adjustment, substantially as described.

2. A planter having a coverer comprising vertically-disposed disks and mechanism for raising and lowering the disks and simultaneously changing the angle or pitch thereof with respect to the line of draft, substantially as described.

3. In combination, a main frame, a vertically-swinging frame coupled with the main frame, disks carried by the free end of said swinging frame, each disk mounted or connected to swing laterally and change its angle or pitch, a rock-shaft carried by the main frame connected to raise and lower said swinging frame, and connections from said rock-shaft to said disks to change the angle of said disks simultaneously with the vertical movement thereof.

4. A main frame, in combination with the vertically-swinging frame, the two disks, the journal-boxes of said disks mounted at the free ends of said frame to swing horizontally, said boxes having arms rigid therewith and pivotally joined together at a point between the disks, and mechanism for raising and lowering said swinging frame and simultaneously swinging said arms forwardly or rearwardly to change the pitch or angle of the disks.

5. A planter provided with a coverer device comprising rotary disks having laterally-swingable carriers, and mechanism swinging said carriers to determine the angle or pitch of said disks with respect to the line of draft, substantially as described.

6. A planter having a coverer comprising a vertically-movable carrier provided with laterally-swingable rotary disks and mechanism for locking the disks at the desired angle and vertical position, substantially as described.

7. A potato-planter having the ground-wheels, and vertically-movable disks provided with mechanism for changing the angle thereof to the line of draft as the disks are moved vertically, said disks arranged to rotate in planes parallel with the line of draft when forced down to support the rear portion of the planter during transportation, substantially as described.

8. A potato-planter having supporting ground-wheels and a furrow-opener, and provided with vertically-disposed coverer-disks in rear of the opener having mechanism for shifting the disks vertically and locking the same in the desired vertical position, whereby the disks can be forced below the plane or level of the opener and assist in supporting the planter for transportation, substantially as described.

9. A potato-planter having a picker-box formed with a rigid curved floor and rigid vertical end walls, a rotary shaft in said box approximately concentric with said curved floor, and picker-arms radiating from said shaft and sweeping said floor and walls and provided with potato-picking means, and means for dropping the potatoes at the point desired, substantially as described.

10. A potato-planter having a picker-box provided with dropping mechanism, and an endless conveyer for supplying potatoes to the picker-box provided with actuating mechanism having controlling means extending into the picker-box and controlled by the potatoes therein to stop and start the conveyer, substantially as described.

11. In a potato-planter, the combination of a feed-box having a discharge and a force feed, a picker-box into which the potatoes from said discharge drop, variable actuating and controlling mechanisms for said force-feed controlling the discharge of potatoes from the feed-box into the picker-box, and potato-dropping mechanism in the picker-box, substantially as described.

12. In a potato-planter, the combination of a feed-box having a discharge-opening, a picker-box at said opening having a floor extending below the plane thereof, a traveling force-feed discharging the potatoes from the feed-box to the picker-box, force-feed-actuating means provided with a stop mechanism extending into and controlled by the potatoes in the picker-box, and dropping mechanism for depositing the potatoes from the picker-box into the furrow, substantially as described.

13. In a potato-planter, the combination of a picker-box, dropping mechanism therein for depositing the potatoes one at a time into the furrow, and positively-driven potato-feeding mechanism provided with a stop-mechanism-controlling device for starting and stopping the movement of the feed mechanism and thereby maintaining the supply of potatoes in the picker-box at an approximately even quantity throughout the operation of the planter, substantially as described.

14. In a potato-planter, the combination of a wheeled supporting-frame, a feed-box having a positively-driven bottom conveyer discharging at one end of the box, actuating mechanism for said conveyer, a stop-controlling mechanism automatically stopping and starting the conveyer, and potato-dropping mechanism receiving the potatoes from said conveyer, substantially as described.

15. A potato-planter, having a picker-box provided with potato-dropping means, force-feed mechanism for feeding potatoes into the picker-box, actuating means for said mechanism, and a stop-controlling device for throwing said actuating means into and out of action comprising a movable member arranged to rest on the potatoes in the picker-box, substantially as described.

16. A potato-planter having a picker-box provided with potato-dropping means, a feeder for discharging potatoes into the picker-box, actuating means for the feeder, and a controlling device for throwing the feeder into and out of gear with its actuating means comprising a rock-shaft having a rigid wing arranged in the picker-box to engage the potatoes in the box, substantially as described.

17. In combination, a feed-box, a picker-box having dropping means, feed mechanism for discharging the potatoes from the feed-box to the picker-box, actuating mechanism to operate said feed mechanism comprising a swinging lever and ratchet mechanism, and a controlling device engaging and operated by the potatoes in the picker-box and comprising a stop or lock for said lever to prevent operative swing thereof, substantially as described.

18. In combination, a wheeled frame, a feed-box, an endless conveyer forming the floor thereof and discharging through an end opening thereof, means for actuating said conveyer, a picker-box in rear of said feed-box and having a floor extending downwardly from said opening, and a shaft in said picker-box carrying radial picker-arms rotating in said box for picking up and dropping the potatoes one at a time, substantially as described.

19. In combination, a wheeled supporting-frame, a feed-box, an endless conveyer forming the floor thereof, a picker-box into which said conveyer discharges, a shaft in the picker-box provided with picker-arms, a rocking lever having actuating means, a ratchet mechanism operatively connecting said lever and said conveyer, a rock-shaft having a wing arranged in the picker-box to engage and be moved by the potatoes in the picker-box, said rock-shaft provided with means arranged to engage and prevent operative swing of said lever, substantially as described.

20. In combination, a wheeled frame, rigid standards extending up therefrom, a feed-box secured to said standards, an endless conveyer forming the bottom of said box, supporting-shafts for said conveyer mounted in said standards, driving mechanism, and potato-dropping mechanism receiving the potatoes discharged by said conveyer, substantially as described.

21. In combination, a horizontal wheeled frame having side bars, a feed-box mounted above said frame and having a rear-end open discharge, force-feed means controlling the discharge of potatoes from said box, a rigid picker-box mounted between the side bars of the frame and having the floor curving downwardly and rearwardly from said discharge from the feed-box, potato-dropping means in said picker-box, a furrow-opener beneath the picker-box, and furrow-coverers in rear of the opener and picker-box.

22. A potato-planter having a rigid picker-box, provided with potato-dropping means, and a feed-box having a discharge-opening into said picker-box, and feed-controlling mechanism determining the discharge of potatoes from the feed-box into the picker-box and comprising a movable member projecting into the picker-box opposite and adjacent to said discharge-opening and arranged to rest on the potatoes in said picker-box, substantially as described.

23. In a potato-planter, the combination of the main frame, comprising longitudinal side bars having cross connections, draft attachments at the front of said frame, a wheeled axle arranged transversely of the front portion of the frame and mounted thereto, covering-disks coupled with the frame and arranged at the rear thereof, and potato carrying and dropping mechanisms carried by the frame, whereby said disks support the rear of the machine during transportation, substantially as described.

24. The combination of a wheeled frame, a furrow-opener coupled thereto, a spring-tooth having the vertical front end secured to the front end of said frame, the tooth from thence extending rearwardly beneath the frame with its flat point deflected downwardly just in advance of the front edge of the opener to engage the soil, substantially as described.

25. In combination, a wheeled frame, a furrow-opener having rearwardly-converging wings or moldboards, braces extending from and rigid with the front of the opener to and rigid with the frame, and upright standards rigid with the rear portions of said moldboards and said frame, substantially as described.

26. In a potato-planter, the combination of a picker-box, a picker-shaft therein, actuating means, two series of radial picker-arms on said shaft at the opposite ends of said box, and arranged above the floor of the box, means causing said arms to drop the potatoes at the rear of the box, and the V-shaped converging deflector on the floor of said box between the paths of said picker-arms.

27. In a potato-planter, the combination of a wheeled frame, a rigid picker-box comprising the ends and curved floor, and the rear upright dam having edge clearance-spaces between its edges and the inner faces of said box ends, a picker-shaft passing through the box provided with radial picker-arms at the ends of the box and moving through said clearance-spaces, and means causing said arms to drop the potatoes in rear of said dam as the arms project beyond the same, substantially as described.

28. In a potato-planter, a picker-box, and rotating picker-arms therein, each arm having a forwardly-projecting rigid picker-pin and provided with the rigid adjacent potato-supporting edges arranged outwardly beyond the pin, arranged to deflect the potato to and hold the same on the pin, substantially as described.

29. A potato-planter having its picker-box provided with a floor and end pieces and radiating rotating picker-arms sweeping above said floor and traveling in engagement with said end pieces and the floor and provided with potato grasping and dropping devices and rigid potato-supporting edges, substantially as described.

30. In a potato-planter, the combination of a wheeled frame, a furrow-opener secured to the frame and formed with a vertical potato-passage at its rear end and provided with a cross-guide forming the rear wall of said passage and the upwardly-projecting guides forming opposite side walls of said passage, means for dropping the potatoes into said passage, and devices for feeding the potatoes to said means, substantially as described.

31. A planter comprising a frame, a furrow-opener, and a coverer in rear of the opener comprising rotary vertically and horizontally adjustable disks provided with a vertically-movable link-arm-and-lever carrier, and lifting and depressing mechanism having a lock for simultaneously adjusting said disks vertically and horizontally, substantially as described.

32. A planter having a coverer comprising a vertically-swinging frame pivotally connected with the planter-frame at its front end, vertically-disposed disks carried by the rear portion of said swinging frame, and mechanism for raising and lowering the frame and simultaneously changing the pitch of the disks and locking the same in the desired position.

33. In combination, a main frame, a wheeled axle at the forward portion thereof, a feed-box carried by the frame, a picker-box in rear of the feed-box, a picker-shaft in said picker-box provided with potato-dropping devices, a conveyer for discharging the potatoes from the feed-box to the picker-box, operating devices actuating the conveyer, a furrow-opener, a fertilizer-box independently mounted above the picker-box and provided with driving means and having an independent swingable spout depending in rear of the picker-box, driving-gearing from said wheeled axle to said picker-shaft and said fertilizer-box-driving means, and a vertically-adjustable frame carrying coverer-disks in rear of said opener.

34. In combination, a main frame provided with a wheeled support, standards rigid with said frame, a potato-receptacle, potato feeding and dropping mechanisms, a furrow-opener coupled with said frame, standards attached to said opener and secured to and extended above said frame, the handles secured to said first-mentioned standards and at intermediate points secured to said extended standards, and operating mechanism, substantially as described.

35. In combination, a main frame provided with a wheeled support, an opener, a potato-receptacle, potato-dropping mechanism, standards from said frame, an independent fertilizer-box secured to said standards above said receptacle and provided with an independent depending movable discharge-spout at the rear of said opener, and operating mechanisms, substantially as described.

36. In a potato-planter, the combination of a main frame, a supporting-axle beneath the front portion thereof provided with supporting-wheels, a furrow-opener coupled to said main frame and located beneath the portion thereof in rear of said axle, coverers in rear of said openers and provided with supporting devices coupled to the main frame, handles secured to the main frame and extending rearwardly therefrom, a feed-box carried by the main frame, a picker-box and potato picking and dropping mechanisms carried by the main frame in rear of said axle, whereby the weight of parts in rear of the axle holds said opener and coverers down to work, and whereby said frame can be rocked vertically from the axle by said handles to raise and depress the opener and coverers, substantially as described.

37. A wheeled planter having a front wheeled axle, and the adjustable rear covering-disks arranged to support the rear portion of the planter during transportation, substantially as described.

38. A potato-planter having its picker-box formed with a curved floor, a radial rotating picker-arm above and sweeping the upper surface of said floor and provided with potato picking and dropping means, and the rigid deflector on the upper surface of said floor and directing the potatoes in the box into the path of said picker-arm, substantially as described.

39. In a potato-planter, the combination of a wheeled frame, a picker-box having a curved floor, means to deliver potatoes to said floor, a shaft, two series of picker-arms on said shaft and moving above said floor, means for discharging the potatoes from said arms, and a rigid inclined deflector arranged along a portion of the length of said floor between the paths traversed by said arms, substantially as described.

40. In a potato-planter, the combination of a main frame, an axle arranged at the front portion of said main frame and provided with the supporting drive-wheels, a feed-box arranged above the main frame and axle, a picker-box in rear of the feed-box and arranged between and rigidly secured to the side bars of the main frame and having its floor extending downwardly and rearwardly to receive the potatoes from the feed-box, means to force the potatoes from the feed-box into the picker-box, potato-dropping means arranged to deposit the potatoes from the picker-box in rear thereof, the furrow-opener beneath the picker-box, a vertically-movable carrier coupled with the main frame and provided with coverer-disks in rear of the opener, and elevating and depressing mechanism carried by the main frame and controlling said carrier, whereby the weight of the parts of the machine in rear of the axle holds down the furrow-opener and coverer-disks, substantially as described.

41. In a potato-planter, the combination of supporting and actuating mechanisms, a rotary picker-shaft, a picker-box having a flat curved floor approximately concentric with said shaft and vertical rigid end walls, the picker-arms radiating from said shaft at opposite ends of the picker-box, said arms having faces sweeping said end walls and end heads sweeping said floor, each picker-arm having the pin to pick up a potato, and provided with potato-dropping means, and the intermediate inclined deflector arranged on said floor between the paths traversed by the picker-arms, substantially as described.

42. In a potato-planter, the combination of supporting and actuating mechanisms, a picker-box comprising rigid end heads or vertical walls and a curved rigid floor, a rotary picker-shaft passing through the end heads, the radial picker-arms rigid with said shaft and arranged in two series at the opposite ends of the picker-box, respectively, the rear end of the picker-box provided with a dam rigid with and extending up from the rear of the floor, the picker-box being formed with the clearance-spaces between the vertical edges of said dam and the end walls of the box for the passage of the picker-arms, actuating mechanism to rotate the picker-shaft so that said arms sweep forwardly and upwardly of the floor of the picker-box and move downwardly with their outer ends in rear of the dam, each arm being provided with a forwardly-projecting rigid pin, mechanism to force the potatoes from the pins and cause the same to drop in rear of said dam, said arms formed to sweep the end walls of the box and the floor thereof, substantially as described.

43. In a potato-planter, the combination, of supporting and operating mechanisms, a picker-box having a vertical end wall and a bottom floor on which the potatoes rest, a rotary picker-shaft provided with a rigid picker-arm projecting radially therefrom and provided with a forwardly-projecting rigid pin arranged laterally a distance from the forward edge of the arm and inwardly a distance from the outer end of the arm, said forward edge and the outer end of the arm being formed to deflect the potatoes toward the pin and to support a potato when on the pin, and potato-dropping means to force the potatoes from the pin, substantially as described.

44. A potato-planter having a picker-box with a vertical end wall and a floor, in combination with a rotary shaft having a radial picker-arm rigid therewith, said arm having a flat face sweeping said vertical wall, and a flat end head sweeping said floor, and a rigid forwardly-projecting pin arranged to one side of said flat face and inwardly from said end head for the purpose substantially as described.

45. In a potato-planter, the combination of supporting and operating mechanisms, a picker-box having rigid vertical end walls and the curved rigid floor on which the potatoes rest and the rigid upright end dam extending upwardly from the rear of said floor and leaving the clearance-spaces between its vertical edges and the end walls, the rigid inclined tapering deflector arranged at an intermediate portion of said floor and extending forwardly and downwardly on the floor from said dam, the rotary picker-shaft passing through said end walls and provided with the series of picker-arms arranged at the ends of the picker-box and sweeping said ends and floor and provided with picking and dropping devices, substantially as described.

46. In a potato-planter, in combination, the horizontally-disposed rigid main frame, comprising parallel side bars connected at their front and rear ends, the supporting-axle arranged at the front portion of the main frame, and provided with the supporting and drive wheels, the feed-box carried by the front portion of the frame over the axle, the picker-box between the side bars of the main frame immediately in rear of the feed-box, potato picking and dropping mechanisms to deliver the potatoes from the picker-box and drop the same in rear thereof, the furrow-opener arranged longitudinally beneath the rear portion of the main frame and having the rigid braces secured at its front end and extending upwardly and forwardly and secured to the forward portion of the main frame, the rigid braces secured to the rear of the opener and extending upwardly and secured to the rear of the main frame, a vertically-movable carrier coupled with the main frame and provided with covering-disks located in rear of the furrow-opener, whereby the weight of the parts in rear of the axle holds down the opener and covering-disks, and the rear handles rigidly secured to the main frame, substantially as described.

47. In a potato-planter, in combination, a main frame provided with supporting means, actuating devices, a furrow-opener, a picker-box carried by the main frame and provided with potato picking and dropping mechanisms, upright standards, a fertilizer-box carried by said standards above the plane of the picker-box, operating mechanism for the fertilizer-box, and the flexible movable spout depending from the fertilizer-box in rear of the picker-box and capable of having its lower discharge end swung independently of the picker-box and opener to drop the fertilizer in rear of or with the potatoes, substantially as set forth.

48. In a potato-planter, in combination, horizontally-disposed main-frame side bars, the axle coupled thereto and provided with the supporting and drive wheels, upright standards from said side bars, the feed-box rigidly secured to said standards, horizontal shafts mounted in said standards, the endless traveling conveyer mounted on said shafts and comprising endless connections carrying cross-bars and forming the floor of said feed-box, driving mechanism for said conveyer arranged to drive the upper surface thereof rearwardly, a picker-box at the discharge end of said conveyer, potato picking and dropping mechanisms in said box and arranged to drop the potatoes in rear thereof, a furrow-opener, and covering means, substantially as described.

49. In a potato-planter, in combination, a horizontally-disposed main frame, a feed-box carried thereby, a picker-box carried thereby provided with potato picking and dropping mechanisms, a furrow-opener beneath the main frame, covering devices, and the spring harrow-tooth at its front end clipped to the front end of the main frame and from thence extending rearwardly with its rear end deflected downwardly immediately in front of the opening edge of the furrow-opener, whereby said harrow-tooth is free to vibrate laterally and vertically, as and for the purposes set forth.

50. In a potato-planter, the combination, of a wheeled supporting-frame, potato-dropping mechanisms, means for feeding potatoes thereto, a furrow-opener secured to the main frame and having diverging rear end moldboards, and coverer-disks provided with supporting and adjusting means, said disks arranged just in rear of said opener with their concave faces adjacent to said moldboards, respectively, whereby the moldboards throw the soil outwardly into said concave faces, which deflect the soil inwardly to cover the furrow, substantially as described.

In testimony whereof I affix my signature in presence of two witnesses.

GEORGE BENNETT DAVISON.

Witnesses:
FRED GIBSON,
EDNA MAY BARTON.